UNITED STATES PATENT OFFICE.

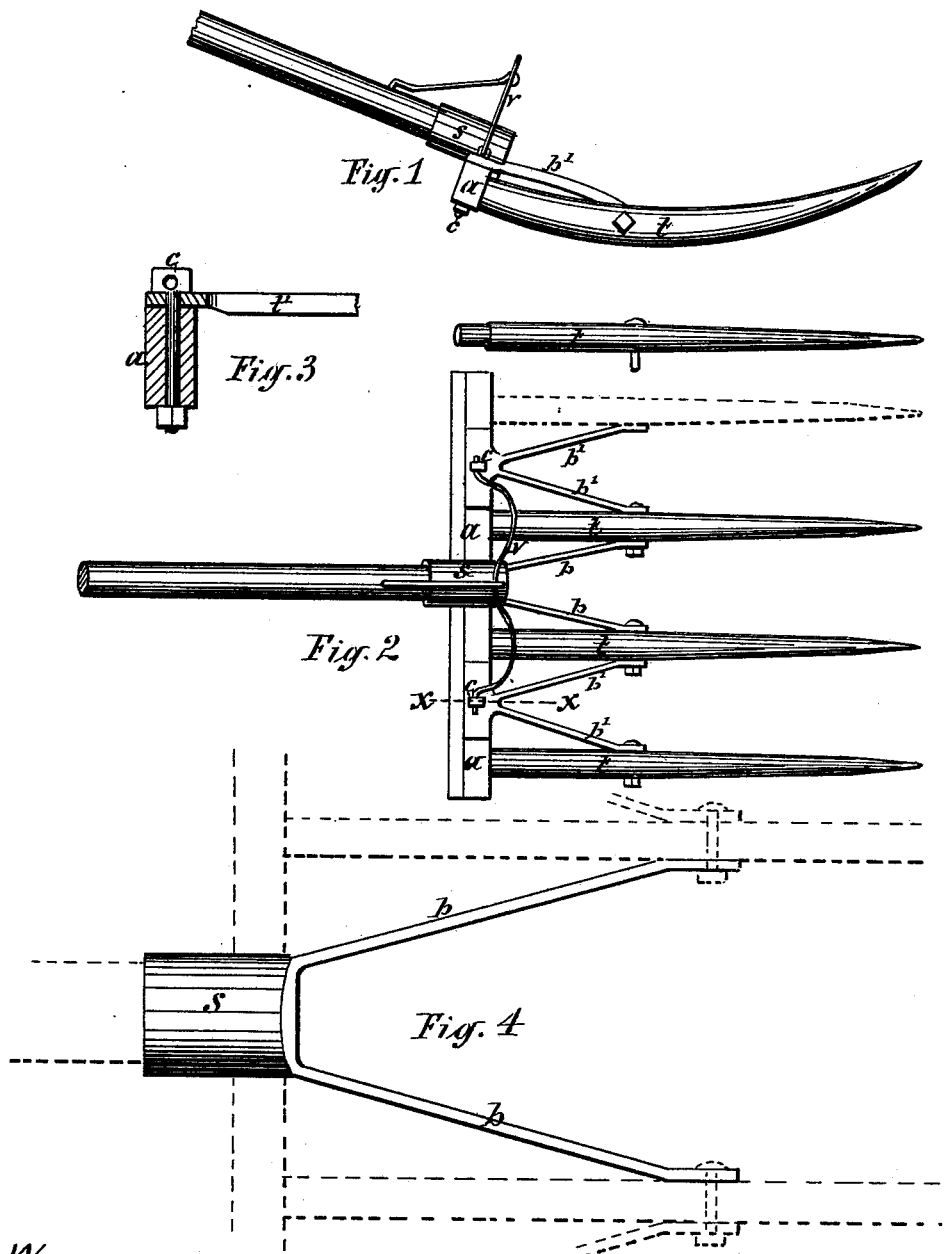

MATHIAS NAUMIER, OF PORT BYRON, NEW YORK, ASSIGNOR OF ONE-HALF HIS RIGHT TO CHARLES CLOW, OF SAME PLACE.

IMPROVEMENT IN FORKS.

Specification forming part of Letters Patent No. 206,894, dated August 13, 1878; application filed July 6, 1878.

*To all whom it may concern:*

Be it known that I, MATHIAS NAUMIER, of Port Byron, in the county of Cayuga, in the State of New York, have invented a new and useful Improvement in Forks, of which the following, taken in connection with the accompanying drawing, is a full, clear, and exact description.

This invention relates to improvements in the class of forks having the tines secured to a wooden head-piece; and it consists, first, in a novel construction of the so-called "stail," and its combination with the tines of the fork, whereby the latter are thoroughly braced, and at the same time rendered more effective in their operation; second, in a novel construction and combination, with tines secured to a wooden head, of V-shaped or crotch braces, whereby the aforesaid advantages are obtained for the outer tines, and the attachment and detachment of same for repairs or renewal is facilitated; and, third, in the combination, with the wooden head of a fork, and with the braces and the usual bow applied to the top of said head, of an eyebolt extended vertically through said brace and head, and provided on the under side of the latter with a nut, whereby the said bolt is made to serve the double function of a fastening for the bow and a stay to the wooden head, and thus dispenses with the extra rivets or bolts heretofore employed for the last-mentioned purpose, all constructed and combined substantially as hereinafter fully described.

The invention is clearly illustrated in the accompanying drawing, wherein Figure 1 is a side view of my improved fork; Fig. 2, a plan view of same, illustrating the facility of attaching and detaching the tines; Fig. 3, an enlarged transverse section on line $x\ x$ of Fig. 2, and Fig. 4 an enlarged plan view of the so-called "stail" of the fork detached.

Similar letters of reference indicate corresponding parts.

$a$ represents the wooden head of a fork, having mortises, in which the tenoned tines are inserted in the usual manner. $s$ is a socket, in which the handle of the fork is attached. This socket is rigidly secured to the head $a$, and has extended from its forward end two rigid braces, $b\ b$, diverging from each other, and attached at their extremities, respectively, to the two inner tines, $t\ t$.

Between the inner and outer tines is a V-shaped or crotch brace, $b'\ b'$, secured at its crotch or junction of its two limbs $b'\ b'$ to the top of head $a$ by bolt $c$. One of its limbs is attached at its extremity to the inner tine by a bolt, which passes through the end of the stail-brace $b$ and through the tine. The other limb, $b'$, is attached at its end to the outer tine by a separate bolt.

The tines are thus readily attached and detached for repairs or renewal, and thoroughly braced without necessitating the long rod, which heretofore was extended across the fork some distance from the head, and the fork is allowed to enter the straw the entire length of the tines.

$c$ is a bolt, provided in its head with an eye, in which is secured the end of the usual wire bow $v$. The shank of the bolt passes through the crotch part of the braces $b'\ b'$, and through the head-piece $a$, and is provided on the under side of the latter with a nut for tightening the parts, thus dispensing with the extra rivets hitherto employed for the purpose of bracing the head $a$.

Having described my invention, what I claim as new, and desire to secure by Letters Patent, is—

1. In combination with a wooden fork-head, the socket $s$, attached to the head $a$, and having extended from its forward end the diverging braces $b'\ b'$, attached at their ends to the tines $t\ t$, substantially as described and shown, and for the purpose set forth.

2. In combination with the wooden head $a$ and tines $t\ t$, the V-shaped or crotch braces $b'\ b'$, substantially in the manner shown and specified.

3. In combination with the wooden head $a$, braces $b'\ b'$, and bow $v$, the eyebolt $c$, substantially as and for the purpose specified.

In testimony whereof I have hereunto set my hand this 29th day of June, 1878.

MATHIAS NAUMIER.

Witnesses:
A. D. BEHAN,
E. BENDIXEN.